United States Patent Office 3,838,089
Patented Sept. 24, 1974

3,838,089
SELF-EXTINGUISHING ORGANOPOLYSILOXANE COMPOSITION
Anthony Enrico Pepe, Hacienda Heights, Calif., assignor to Stauffer Chemical Company
No Drawing. Continuation of application Ser. No. 181,255, Sept. 16, 1971, which is a continuation of application Ser. No. 746,307, July 22, 1968, both now abandoned. This application Jan. 26, 1973, Ser. No. 326,918
Int. Cl. C08g 51/30
U.S. Cl. 260—33.8 SB                   10 Claims

ABSTRACT OF THE DISCLOSURE

A self-extinguishing elastomeric organpolysiloxane composition comprising (1) a curable organopolysiloxane, (2) a halogenated organic compound containing at least 35 percent by weight of halogen, said halogenated compound being present in an amount to provide a composition having a halogen content of from 15 to 50 percent by weight based on the weight of organopolysiloxane, and (3) a metallic compound, wherein the cation of the metallic compound is selected from the group consisting of antimony, arsenic, and bismuth and the anion is selected from the class consisting of oxides, halides, and oxyhalides.

---

This is a continuation of application Ser. No. 181,255, filed Sept. 16, 1971 and now abandoned which is a continuation of my copending application Ser. No. 746,307, filed July 22, 1968 now abandoned.

The present invention relates to an organopolysiloxane, particularly to a self-extinguishing curable organopolysiloxane and more particularly to an elastomeric organopolysiloxane having self-extinguishing properties.

Heretofore, silicone rubbers were known and used in many industrial applications because of their excellent properties, such as thermal stability, dielectric properties, resistance to atmospheric deterioration, chemical inertness, and retention of properties over extreme temperature ranges. However, these silicone rubbers do not have the necessary flame retardancy and self-extinguishing properties when exposed to an open flame. Even silicone rubbers which contain inert fillers, such as finely divided silicon dioxide or calcium carbonate, will continue to burn for an indefinite period of time unless extinguished by external means. Although self-extinguishing properties are essential in many commercial applications, especially in the electrical industry, many of the silicone rubbers presently available do not possess these characteristics.

Therefore, it is an object of this invention to provide a self-extinguishing organopolysiloxane composition. Another object of this invention is to provide a self-extinguishing room-temperature-curable organopolysiloxane. Still another object of this invention is to provide a room-temperature-curable organopolysiloxane having flame retardant properties. A further object of this invention is to provide a method for preparing a self-extinguishing curable organopolysiloxane composition.

The foregoing objects and others which will become apparent from the following descriptions are accomplished in accordance with this invention, generally speaking, by providing a curable organopolysiloxane composition having self-extinguishing properties which comprises (1) a fluid organopolysiloxane, (2) a halogenated organic compound containing at least 35 percent by weight of halogen, said halogenated compound being present in an amount to provide a composition having a halogen content of from 15 to 50 parts by weight based on the weight of the organpolysiloxane, and (3) a metallic compound, wherein the metal is selected from the group consisting of antimony, arsenic, and bismuth and the anion is selected from the class consisting of oxides, halides, and oxyhalides.

In other words, the organopolysiloxane composition contains a sufficient amount of a halogenated organic compound having a halogen content of at least 35 percent to provide a self-extinguishing organopolysiloxane composition having a halogen content of from 15 to 50 percent and a metallic oxide, halide, or oxyhalide and a filler, if desired. It was found that a halogen content below about 15 percent will not impart self-extinguishing properties to the composition, while a halogen content above about 50 percent will affect the physical properties of the curable organopolysiloxane composition.

More specifically, the composition contains a fluid organopolysiloxane having the general formula:

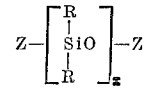

wherein R, which may be the same or different, represents monovalent hydrocarbon radicals, halogenated monovalent hydrocarbon radicals, and cyanoalkyl radicals; Z represents a functional group which is hydrolyzable or condensable; and $x$ is an integer of from 1 to 20,000.

Examples of suitable monovalent hydrocarbon radicals represented by R above are alkyl radicals having from 1 to 18 carbon atoms, such as methyl, ethyl, propyl, butyl, hexyl, octyl, dodecyl, etc.; aryl radicals, such as phenyl, diphenyl, naphthyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl; and alkenyl radicals, such as vinyl, allyl, and the like. Z represents groups which are hydrolyzable or condensable, such as hydroxyl radicals, halogen radicals, carboxy radicals (—OOCR′),
carbonoxy radical (—OR′),

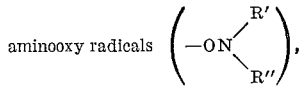

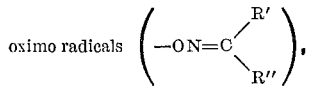

and

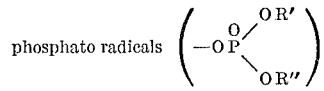

in which R′ and R″ may be the same or different and represent monovalent hydrocarbon radicals and halogenated monovalent hydrocarbon radicals. Examples of suitable carboxy radicals are monacyl radicals of carboxylic acids, such as acetoxy, propionyloxy, valeryloxy, caproyloxy, myristoyloxy, and stearoyloxy radicals. Suitable examples of carbonoxy groups having from 1 to 10 carbon atoms are methoxy, ethoxy, butoxy, heptoxy, octoxy, decoxy, phenoxy, and the like; aminooxy groups, such as dimethylaminooxy, diethylaminooxy, dipropylaminooxy, dibutylaminooxy, dioctylaminooxy, diphenylaminooxy, methylphenylaminooxy, ethylmethylaminooxy, and the like. Suitable oximo groups are acetophenoximo, acetoximo, benzophenoximo, isopropylketoximo, chlorocyclohexanoximo, and the like. Suitable phosphato groups are dimethylphosphato, diethylphosphato, dibutylphosphato, dihexylphosphato, dioctylphosphato, dodecylphosphato, methylethylphosphato, butylhexylphosphato, diphenylphosphato, and the like. Although the organopolysiloxane may have any of the terminal functional groups mentioned above, it is preferred that it have terminal hydroxyl groups.

The curing agents used in the practice of the present invention are well known in the art and are selected from the class consisting of organosilanes and organosilicates. The organosilanes may be represented by the formula:

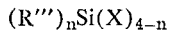

while the organosilicates may be represented by the formula:

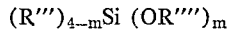

wherein $R'''$ is a relatively inert group, such as a monovalent hydrocarbon radical, a halogenated monovalent hydrocarbon radical, or an alkoxy radical; $R''''$ is a monovalent hydrocarbon or a halogenated monovalent hydrocarbon radical having up to 8 carbon atoms; X is a radical readily hydrolyzable by ambient moisture, such as acyloxy radicals, oximo radicals, aminooxy radicals, and phosphato radicals; $n$ is a number of from 1 to 2; and $m$ is a number of from 3 to 4. Examples of monovalent hydrocarbon radicals represented by $R'''$ above are methyl, ethyl, propyl, butyl, hexyl, octyl, phenyl, vinyl, allyl, ethylallyl, butadienyl, and the like; halogenated hydrocarbons are chloromethyl, 2-bromo-4,6-diiodophenyl, 1,2-dichlorovinyl, 3,4 - difluorocyclopentyl, 2-bromocyclopentene-2,3-yl, and 6-chlorohexyl. Examples of suitable organosilanes are methyltriacetoxysilane, isopropoxytriacetoxysilane, methyldiacetoxyaminooxysilane, methyltris-diethylaminooxysilane, ethyltriacetoxysilane, dimethoxydiacetoxysilane, dipropoxydiacetoxysilane, dibutyldiacetoxysilane, and the like. Suitable examples of organosilicates are mono-organotrihydrocarbonoxysilanes, tetrahydrocarbonoxysilanes, e.g., ortho silicates and partial hydrolyzates of such silanes, ethyl orthosilicates or partial hydrolyzated ethyl silicates, such as ethyl silicate "40" which consists primarily of decaethyl tetrasilicate.

The amount of curing agent used may range from about 0.5 to about 10 percent, preferably from about 1 to 5 percent by weight based on the weight of the organopolysiloxane.

In addition, a metal salt of a carboxylic acid should be used as a catalyst to promote curing of the system utilizing organopolysiloxanes and organosilicates. Examples of metals which may be used are lead, tin, cobalt, iron, cadmium, chromium, nickel, zinc, and the like. Examples of suitable catalysts are dibutyltin dilaurate, dibutyltin diacetate, cobalt naphthenate, chromium octoate, dibutyltin benzoate, and the like. Other catalysts which may be employed are dibutyltin butoxychloride, bis(acetoxybutylphenyltin) oxide, bis(butyldimethyltin) oxide, bis-(diethylhexyltin) oxide, bis(tributyltin) oxide, benzylbutylphenyltin hydroxide, di-t-butylchlorotin hydroxide, diphenylchlorotin hydroxide, and the like. While the amount of catalyst used is determined by the cure rate desired, generally from about 0.5 to about 1 percent based on the combined weight of the organopolysiloxane and the curing agent is sufficient.

The halogenated organic compounds employed in the practice of the present invention are known in the art. Examples of suitable compounds which are halogenated to varying degrees are chlorinated paraffins containing from 65 to 75 weight percent chlorine, chlorinated hexamethylbenzenes containing from 4 to 12 chlorine atoms, chlorinated waxes containing 40 percent chlorine, chlorinated biphenyls, chlorinated terphenyls, mixtures of chlorinated biphenyls and chlorinated terphenyls, and chlorinated higher polyphenyls containing at least 35 percent by weight chlorine based on the total weight of the chlorinated compound. Other halogenated compounds which may be used are 4,4'-dibromobiphenyl,
4,4'-dichlorobiphenyl,
hexachloro-1,3-butadiene,
1,2,3,4-tetrachloro-1,3-butadiene,
1,2-dibromocyclohexane,
1,3-dibromocyclohexane,
1,4-dibromocyclohexane,
1,2-dichlorocyclohexane,
1,4-dichlorocyclohexane,
1,2,3,4,5,6-heptachlorocyclohexane,
1,2,3,4,5,6-hexachlorocyclohexane,
3,4,5,6,7,8,8a-heptachloro-*alpha*-dicyclopentadiene,
1,2-dichloronaphthylene,
1,4-dichloronaphthylene,
octachloronaphthylene,
diallylchlorendate,
tetrachloro-p-xylene dichloride,
diallyloxytetrachloro-*m*-xylene,
4,4'-isopropylidenebis(2,6-dichlorophenyl),
1,4,5,6,7,7-hexachlorobicyclo(2.2.1) hepta-5-ene-2,3-
   dicarboxylic anhydride,
poly(chlorotrifluoroethylene), and the like.

Where it is desired to improve both the low temperature modulus values and the self-extinguishing properties of the cured organopolysiloxane composition, halogenated plasticizers, such as methylpentachlorostearate, chlorinated paraffins, and chlorowaxes, may be used.

The metallic compounds employed in the practice of the present invention are arsenic, antimony, and bismuth oxides, halides, and oxyhalides. Suitable examples of these compounds are arsenic trioxide, arsenic pentaoxide, arsenic trichloride, arsenic tribromide, antimony tribromide, antimony trioxide, antimony tetraoxide, antimony pentaoxide, antimony oxychloride, antimony tribromide, antimony trichloride, antimony pentachloride, bismuth oxide, bismuth trioxide, bismuth tetraoxide, bismuth pentaoxide, bismuth oxybromide, bismuth oxychloride, bismuth trichloride, bismuth tetrachloride, bismuth tribromide, and the like. Generally, these compounds are employed in a finely divided state and preferably have an average particle size of only a few microns, preferably less than about 44 microns and more preferably an average particle size of about 20 microns.

The proportions of the halogenated organic compounds and metallic compounds can vary within very wide limits. However, in order to obtain desirable physical properties in combination with self-extinguishing properties, a sufficient amount of the halogenated organic compound should be present to provide a halogen content of from about 15 to 50 percent and more preferably from about 25 to 40 percent by weight based on the weight of the organopolysiloxane. In addition, the metallic compound may vary from about 2 to 15 percent and more preferably from about 5 to 12 percent by weight based on the weight of the organopolysiloxane. Where a metallic halide is used in combination with a halogenated organic compound, the total amount of halogenated organic compound may be reduced accordingly to provide a total halogen content of from 15 to 50 percent based on the weight of the organopolysiloxane. However, the halogen content of the self-extinguishing compositions of this invention should be in the range of from about 15 to 50 percent, and more preferably from about 25 to 35 percent by weight based on the weight of the organopolysiloxane.

In preparing the self-extinguishing room temperature-curable organopolysiloxane compositions of the present invention, a hydroxyl-terminated organopolysiloxane, an organosilane curing agent, a halogenated organic compound, and a metallic oxide or halide and a filler, if desired, may be mixed in the absence of moisture without particular regard to the order in which the ingredients are added.

Where an organosilicate is substituted for the organosilane curing agent, the ingredients may again be mixed thoroughly without particular regard to the order in which they are added, except with respect to the metallic catalyst. Since the composition is curable at room temperature, it will begin to cure as soon as the metallic catalyst is added. Accordingly, it is preferred to mix all the ingredients thoroughly and then add the metallic catalyst only at the time at which the composition is to be converted to the cured solid elastomeric state. Within a matter of a few minutes after addition of the metallic catalyst, the composition, which initially is in a semifluid state, will begin to cure an an elastomeric state and will completely cure within from about 24 and 48 hours of the time of which the metallic catalyst is added.

Suitable fillers which may be employed are finely divided silicas, such as silica aerogels, fumed silicas, diatomaceous earths, titanium dioxide, lithopone, and fillers treater with, e.g., trimethylchlorosilane. The amount of filler employed may vary widey and may comprise, for example, from about 25 to 300 percent of the weight of the organopolysiloxane. The exact amount of filler employed will depend upon such factors as the application for which the organopolysiloxane is intended, the type of organopolysiloxane, and the filler used.

While the halogenated organic compound and the metallic oxide or halide may be added separately, it is preferred that the metallic oxide or halide be dispersed on the inert filler and then added to the hydroxylterminated organopolysiloxane along with the curing agent.

In order to evaluate the self-extinguishing properties of the room-temperature-curable organopolysiloxane described above, a test was employed which consisted of suspending a cured silicone rubber bar (½ x ½ x 6 inches) over a Bernzomatic burner having a blue cone approximately 1½ inches long in such a manner that the end of the bar is about ¼ inch from the tip of the blue cone. The bar is held in the flame for a period of about 20 seconds at which time the flame is removed and the time required for the glow to disappear, "glow-out" time, is measured.

The self-extinguishing silicone rubber compositions of the present invention have many applications. These compositions may be used for encapsulating electrical components, for caulking materials, and in applications which may encounter an open flame. In these last mentioned applications, the self-extinguishing characteristics of the composition of the present invention are particularly useful.

Various aspects of the invention are further illustrated by the following examples which are not to be taken as in any way limiting the scope thereof. In the examples, all parts are by weight unless otherwise specified.

EXAMPLE 1

Several room-temperature-curable organopolysiloxane formulations are prepared, each of which contains 100 parts of a hydroxyl-terminated polydimethylsiloxane having a viscosity of about 2,000 cs. at 25° C., 30 parts of a hydrated aluminum oxide, 25 parts of diatomaceous earth (Celite 350) and 2.5 parts of ethyl silicate "40." To each of the mixtures described above are added varying amounts of perchloropentacyclodecane and antimony silico oxide (50 percent antimony oxide and 50 percent silicon dioxide), and about 3 parts of dibutyltin butoxychloride. The mixtures are molded into bars (½ x ½ x 6 inches) and cured at room temperature for 24 hours. The self-extinguishing properties of the bars are measured in accordance with the procedure described above. The "glow-out" times for the cured bars are illustrated in Table I.

TABLE I

| Example number | Perchloro- pentacyclo- decane, parts | Antimony silico oxide, parts | "Glow-out" time, seconds |
| --- | --- | --- | --- |
| 1(a) | 0 | 0 | 15.0 |
| 1(b) | 0 | 12 | 13.3 |
| 1(c) | 37 | 0 | 3.0 |
| 1(d) | 18 | 6 | 13.0 |
| 1(e) | 30 | 10 | 2.3 |
| 1(f) | 37 | 12 | <2.0 |
| 1(g) | 60 | 20 | 2.2 |

EXAMPLE 2

In accordance with the procedure described in Example 1, about 12 parts of antimony silico oxide and about 70 parts of a chlorinated paraffin containing 70 percent of chemically combined chlorine are mixed in the organopolysiloxane composition. The formulation is molded into bars and cured at room temperature for 24 hours. The "glow-out" time of the bars is determined in accordance with the procedure described above. The composition exhibits a "glow-out" of less than 2 seconds. The cured composition exhibits a lower modulus value at low temperatures than the organopolysiloxane prepared in Example 1(e).

EXAMPLE 3

In accordance with the procedure described in Example 2, about 5 parts of antimony trichloride is substituted for the antimony silico oxide. The formulation is molded into bars and cured at room temperature for 24 hours. The bars exhibit a "glow-out" time of less than 2 seconds.

EXAMPLE 4

In accordance with the procedure described in Example 3 above, about 6 parts of bismuth trioxide is substituted for the antimony trichloride. The bars thus formed, exhibit a "glow-out" time of about 3 seconds.

EXAMPLE 5

In accordance with the procedure described in Example 2 above, about 80 parts of chlorinated hexamethylbenzene containing 50 percent chlorine is substituted for the perchloropentacyclodecane and molded into bars. After curing the bars for 24 hours at room temperature, they are tested for self-extinguishing properties in accordance with the procedure described above. The "glowout" time is about 4 seconds.

EXAMPLE 6

In accordance with the procedure described in Example 2, about 100 parts of methylpentachlorostearate is substituted for the perchloropentacyclodecane and molded into bars. After curing at room temperature for 24 hours, the bars are tested for self-extinguishing properties. While the "glow-out" time is about 6 seconds, the composition exhibits a lower modulus value at low temperatures than the composition prepared in accordance with Example 1(e).

EXAMPLE 7

(a) In accordance with the procedure described in Example 1, about 60 parts of 1,1,2,3,4,5,6-heptachlorocyclohexane is substituted for the perchloropentacyclodecane and molded into test tbars. The bars are cured at room temperature for 24 hours and then tested in accordance with the procedure described above for self-extinguishing properties.

(b) In a similar example, 20 parts of antimony silico oxide are added to an organopolysiloxane composition prepared in accordance with the procedure described in Example 1 and molded into bars. The bars are cured for 24 hours at room temperature and then tested for self-extinguishing properties.

(c) In a similar example, approximately 30 parts of 1,1,2,3,4,5,6-heptachlorocyclohexane and about 10 parts of antimony silico oxide are added to the organopolysiloxane formulation prepared in accordance with the procedure described in Example 1 and molded into bars. After curing at room temperature for 24 hours, the self-extinguishing properties of the bars are determined in accordance with the procedure described above. The results of these experiments are illustrated in Table II.

TABLE II

| Example number | Hepta-chlorocyclohexane, parts | Antimony silico oxide, parts | "Glow-out" time, seconds |
|---|---|---|---|
| 7(a) | 60 | 0 | 22 |
| 7(b) | 0 | 20 | 43 |
| 7(c) | 30 | 10 | 5 |

The results shown in Table II illustrate the improved self-extinguishing properties which are achieved by combining a chlorinated compound with antimony oxide in an organopolysiloxane composition.

EXAMPLE 8

In accordance with the procedure described in Example 2, about 60 parts of tetrachloro-p-xylene dichloride is substituted for the perchloropentacyclodecane. The formulation is molded into test bars and cured for 24 hours at room temperature. The bars which are tested in accordance with the procedure described above, exhibit a "glow-out" time of 6 seconds.

EXAMPLE 9

In accordance with the procedure described in Example 1, about 37 parts of perchloropentacyclodecane and 6 parts of arsenic trioxide are mixed in the organopolysiloxane composition and molded into test bars. After curing for 24 hours at room temperature, the bars exhibit a "glow-out" time of about 7 seconds.

EXAMPLE 10

About 100 parts of polydimethylsiloxane having a viscosity of about 1,200 cps. at 25° C. is mixed with 25 parts of diatomaceous earth (Celite 350), 30 parts of alumina trihydrate, 37 parts of perchloropentacyclodecane, and 12 parts of antimony silica oxide (50 percent antimony oxide and 50 percent silicon dioxide). To the above formulation are added about 56 parts of methyltriacetoxysilane and about 0.3 parts of dibutyltin diacetate with agitation.

The formulation is molded into test bars (½ x ½ x 6 inches), cured at room temperature for 24 hours, and then tested for self-extinguishing properties in accordance with the procedure described above. The test bars exhibit a "glow-out" time of about 4 seconds.

When other halogenated organic compounds, such as 1,2-dibromocyclohexane, 4,4'-dibromobiphenyloctachloronaphthylene, and the like, are used in combination with arsenic, antimony, and bismuth oxides, halides, and oxyhalides in conventional organopolysiloxane compositions, similar self-extinguishing properties are obtained.

Although specific examples of the invention have been described herein, it is not intended to limit the invention solely thereto but to include all the variations and modifications falling within the spirit and scope of the appended claims.

The invention claimed is:

1. A self-extinguishing organopolysiloxane composition which is capable of curing to an elastomeric solid at room temperature comprising (1) an organopolysiloxane having repeating units of the formula

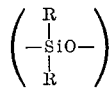

in which R is selected from the class consisting of monovalent hydrocarbon radicals, halogenated monovalent hydrocarbon radicals and cyanoalkyl radicals and having terminal groups selected from the class consisting of hydroxyl groups and hydrolyzable groups, (2) a halogenated organic hydrocarbon selected from the class consisting of heptachlorocyclohexane and perchloropentacyclodecane, said halogenated hydrocarbon being present in an amount to provide a composition having a halogen content of from 15 to 50 percent by weight based on the weight of the organopolysiloxane and (3) from 2 to 15 percent by weight based on the weight of the organopolysiloxane of a metallic compound selected from the group consisting of halides and oxyhalides of antimony, arsenic and bismuth, oxides of arsenic and bismuth and antimony silico oxide and when the organopolysiloxane is a hydroxyl terminated organopolysiloxane, the composition further contains a curing agent selected from the group consisting of organosilanes of the formula $(R''')_n Si(X)_{4-n}$ and organosilicates of the formula $(R''')_{4-m} Si(OR'''')_m$ wherein $R'''$ is selected from the group consisting of a monovalent hydrocarbon radical, a halogenated monovalent hydrocarbon radical and an alkoxy radical, $R''''$ is selected from the group consisting of a monovalent hydrocarbon radical and a halogenated monovalent hydrocarbon radical having up to 8 carbon atoms, X is a hydrolyzable radical selected from the class consisting of acyloxy radicals, oximo radicals, aminoxy radicals and phosphato radicals, $n$ is a number of from 1 to 2 and $m$ is a number of from 3 to 4.

2. The composition of Claim 1 wherein the halogenated organic hydrocarbon is heptachlorocyclohexane.

3. The composition of Claim 1 wherein the halogenated organic hydrocarbon is perchloropentacyclodecane.

4. The composition of Claim 3 wherein the metallic compound is antimony silico oxide.

5. The composition of Claim 1 wherein the metallic compound is a mixture consisting of 50 percent antimony oxide and 50 percent silicon dioxide.

6. The composition of Claim 2 wherein the metallic compound is bismuth trioxide.

7. The composition of Claim 3 wherein the metallic compound is bismuth trioxide.

8. The composition of Claim 3 wherein the metallic compound is bismuth oxychloride.

9. The composition of Claim 2 wherein the metallic compound is arsenic trichloride.

10. A self-extinguishing organopolysiloxane composition which is capable of curing to an elastomeric solid at room temperature comprising (1) an organopolysiloxane having repeating units of the formula

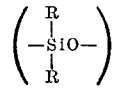

in which R is selected from the class consisting of monovalent hydrocarbon radicals, halogenated monovalent hydrocarbon radicals and cyanoalkyl radicals and having terminal groups selected from the class consisting of hydroxyl groups and hydrolyzable groups, (2) heptachlorocyclohexane in an amount sufficient to provide a composition having a halogen content of from 15 to 50 percent by weight based on the weight of the organopolysiloxane and (3) from 2 to 15 percent by weight based on the weight of the organopolysiloxane of antimony oxide and when the organopolysiloxane is a hydroxyl terminated organopolysiloxane the composition further contains a curing agent selected from the group consisting of organosilanes of the formula $(R''')_n Si(X)_{4-n}$ and organosilicates of the formula $(R''')_{4-m} Si(OR'''')_m$ wherein $R'''$ is selected from the group consisting of a monovalent hydrocarbon radical, a halogenated monovalent hydrocarbon radical and an alkoxy radical, $R''''$ is selected from the group consisting of a monovalent hydrocarbon radical and a halogenated monovalent hydrocarbon radical having up to 8 carbon atoms, X is a hydrolyzable radical selected from the class consisting of acyloxy radicals, oximo radicals, aminoxy radicals and phosphato radicals, $n$ is a number of from 1 to 2 and $m$ is a number of from 3 to 4.

References Cited
UNITED STATES PATENTS

| | | | |
|---|---|---|---|
| 3,024,210 | 3/1962 | Weyer | 260—45.7 R |
| 3,296,161 | 1/1967 | Kulpa | 260—45.7 R |
| 3,445,404 | 5/1969 | Rondon | 260—45.7 R |
| 2,669,521 | 2/1954 | Bierly | 106—15 FP |
| 2,590,211 | 3/1952 | Ruger | 106—15 FP |

OTHER REFERENCES

Miles & Briston, "Polymer Technology," 1965, pp. 342–343.

Encyclopedia of Polymer Science & Technology, 1967, vol. 7, "Flame Retardancy," pp. 16–18.

ALLAN LIEBERMAN, Primary Examiner

P. R. MICHL, Assistant Examiner

U.S. Cl. X.R.

260—28, 37 SB, 45.7 R, 45.75 B, DIG 24